US012787115B2

(12) United States Patent
Turtinen et al.

(10) Patent No.: US 12,787,115 B2
(45) Date of Patent: Nov. 3, 2026

(54) PAGING HANDLING WITH DIFFERENT DRX CYCLES

(71) Applicant: Nokia Technologies Oy, Espoo (FI)

(72) Inventors: Samuli Heikki Turtinen, Oulu (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 56 days.

(21) Appl. No.: 18/788,957

(22) Filed: Jul. 30, 2024

(65) Prior Publication Data

US 2025/0048489 A1 Feb. 6, 2025

(30) Foreign Application Priority Data

Jul. 31, 2023 (GB) ...................................... 2311732

(51) Int. Cl.
*H04W 68/00* (2009.01)
*H04W 68/02* (2009.01)
*H04W 76/28* (2018.01)

(52) U.S. Cl.
CPC ........... *H04W 76/28* (2018.02); *H04W 68/02* (2013.01)

(58) Field of Classification Search
CPC . H04W 76/28; H04W 68/02; H04W 52/0216; H04W 68/00; Y02D 30/70
See application file for complete search history.

(56) References Cited

U.S. PATENT DOCUMENTS

2016/0330791 A1 11/2016 Vajapeyam et al.
2016/0345293 A1 11/2016 Diachina et al.
2018/0338281 A1 11/2018 Bangolae et al.
2019/0223147 A1 7/2019 Chen et al.
(Continued)

FOREIGN PATENT DOCUMENTS

EP 4203573 A1 6/2023
WO WO-2016182530 A1 * 11/2016 ........ H04W 52/0216
(Continued)

OTHER PUBLICATIONS

3GPP, User Equipment (UE) procedures in Idle mode and in RRC Inactive state (3GPP TS 38.304 version 18.1.0 Release 18); May 2024, ETSI, 3GPP TS 38.304 version 18.1.0 Release 18, pp. 40-55 (Year: 2024).*
(Continued)

*Primary Examiner* — Sahar Motazedi
*Assistant Examiner* — Labibah Ilma Ali
(74) *Attorney, Agent, or Firm* — Lippes Mathias LLP

(57) ABSTRACT

Described herein is a solution for paging. According to an aspect, there is provided user equipment configured to: determine a user equipment configuration, wherein the user equipment configuration comprises at least one of idle extended discontinuous reception, inactive extended discontinuous reception, or inactive enhanced extended discontinuous reception; determine a network node configuration, wherein the network node configuration defines an allowability status for at least one of idle extended discontinuous reception, inactive extended discontinuous reception, or inactive enhanced extended discontinuous reception; determine a discontinuous reception cycle based at least on the user equipment configuration and the network node configuration; and receive a paging request based on the discontinuous reception cycle.

18 Claims, 9 Drawing Sheets

(56) References Cited

U.S. PATENT DOCUMENTS

| | | | | |
|---|---|---|---|---|
| 2020/0280956 | A1 | 9/2020 | Zhang | |
| 2022/0053517 | A1 | 2/2022 | Kim et al. | |
| 2022/0304102 | A1 | 9/2022 | Marco | |
| 2023/0199902 | A1 | 6/2023 | Vogedes et al. | |
| 2024/0179792 | A1 * | 5/2024 | Höglund | H04W 76/28 |

FOREIGN PATENT DOCUMENTS

| | | | | |
|---|---|---|---|---|
| WO | 2021/197286 | A1 | 10/2021 | |
| WO | 2023/029051 | A1 | 3/2023 | |
| WO | WO-2024/210561 | A1 * | 4/2024 | H04W 68/02 |

OTHER PUBLICATIONS

"3rd Generation Partnership Project; Technical Specification Group Radio Access Network; Study on further NR RedCap UE complexity reduction (Release 18)", 3GPP TR 38.865, V18.0.0, Sep. 2022, pp. 1-52.

"[AT109e][419][eMTC/NB-IoT] Connection to 5GC: Open Issues (Huawei)", 3GPP TSG-RAN WG2 Meeting #109e, R2-200xxxx, Agenda: 7.1.12, Huawei, Feb. 24-Mar. 6, 2020, 9 pages.

Search Report received for corresponding United Kingdom Patent Application No. 2311732.8, dated Jan. 30, 2024, 6 pages.

* cited by examiner 300 340 350 310 370

| UE configuration | eDRX-AllowedIdle broadcasted | eDRX-AllowedInactive broadcasted | enhanced-eDRX-AllowedInactive broadcasted | UE selection |
|---|---|---|---|---|
| IDLE eDRX | No | No | No | DRX |
| IDLE eDRX | Yes | No | No | IDLE eDRX |
| IDLE eDRX | No | Yes | No | DRX |
| IDLE eDRX | No | No | Yes | DRX |
| IDLE eDRX | Yes | Yes | No | IDLE eDRX |
| IDLE eDRX | Yes | No | Yes | IDLE eDRX |
| IDLE eDRX | No | Yes | Yes | DRX |
| IDLE eDRX | Yes | Yes | Yes | IDLE eDRX |

Figure 3A

300 | 320 | 340 | 350 | 380

| UE configuration | eDRX-AllowedIdle broadcasted | eDRX-AllowedInactive broadcasted | enhanced-eDRX-AllowedInactive broadcasted | UE selection |
|---|---|---|---|---|
| **INACTIVE eDRX** | No | No | No | INACTIVE DRX |
| **INACTIVE eDRX** | Yes | No | No | INACTIVE DRX |
| **INACTIVE eDRX** | No | Yes | No | INACTIVE eDRX |
| **INACTIVE eDRX** | No | No | Yes | INACTIVE DRX |
| **INACTIVE eDRX** | Yes | Yes | No | INACTIVE eDRX |
| **INACTIVE eDRX** | Yes | No | Yes | INACTIVE DRX |
| **INACTIVE eDRX** | No | Yes | Yes | INACTIVE eDRX |
| **INACTIVE eDRX** | Yes | Yes | Yes | INACTIVE eDRX |

Figure 3B 300 350 340 380 330

| UE configuration | eDRX-AllowedIdle broadcasted | eDRX-AllowedInactive broadcasted | enhanced-eDRX-AllowedInactive broadcasted | UE selection |
|---|---|---|---|---|
| INACTIVE enhanced eDRX | No | No | No | INACTIVE DRX |
| INACTIVE enhanced eDRX | Yes | No | No | INACTIVE DRX |
| INACTIVE enhanced eDRX | No | Yes | No | INACTIVE DRX |
| INACTIVE enhanced eDRX | No | No | Yes | INACTIVE enhanced eDRX |
| INACTIVE enhanced eDRX | Yes | Yes | No | INACTIVE DRX |
| INACTIVE enhanced eDRX | Yes | No | Yes | INACTIVE enhanced eDRX |
| INACTIVE enhanced eDRX | No | Yes | Yes | INACTIVE enhanced eDRX |
| INACTIVE enhanced eDRX | Yes | Yes | Yes | INACTIVE enhanced eDRX |

Figure 3C 300 340 350 380 360

| UE configuration | eDRX-AllowedIdle broadcasted | eDRX-AllowedInactive broadcasted | enhanced-eDRX-AllowedInactive broadcasted | UE selection |
|---|---|---|---|---|
| BOTH INACTIVE eDRX & INACTIVE enhanced eDRX | No | No | No | INACTIVE DRX |
| BOTH INACTIVE eDRX & INACTIVE enhanced eDRX | Yes | No | No | INACTIVE DRX |
| BOTH INACTIVE eDRX & INACTIVE enhanced eDRX | No | Yes | No | INACTIVE eDRX |
| BOTH INACTIVE eDRX & INACTIVE enhanced eDRX | No | No | Yes | INACTIVE enhanced eDRX |
| BOTH INACTIVE eDRX & INACTIVE enhanced eDRX | Yes | Yes | No | INACTIVE eDRX |
| BOTH INACTIVE eDRX & INACTIVE enhanced eDRX | Yes | No | Yes | INACTIVE enhanced eDRX |
| BOTH INACTIVE eDRX & INACTIVE enhanced eDRX | No | Yes | Yes | INACTIVE enhanced eDRX |
| BOTH INACTIVE eDRX & INACTIVE enhanced eDRX | Yes | Yes | Yes | INACTIVE enhanced eDRX |

Figure 3D

PAGING HANDLING WITH DIFFERENT DRX CYCLES

TECHNOLOGICAL FIELD

An example embodiment relates generally to paging handling with different discontinuous reception cycles, and more specifically, to paging handling depending on whether extended discontinuous reception cycles are allowed in a cell.

BACKGROUND

In some circumstances, when a user equipment is camping on a cell that does not allow a particular extended discontinuous reception cycle, a core network or radio access network may believe that the user equipment is using that particular extended discontinuous reception cycle. This may lead to a situation where the core network or radio access network and the user equipment are not synchronized on the discontinuous reception cycle that the user equipment is using. For example, if idle extended discontinuous reception is not allowed on a cell in which the user equipment is monitoring paging. A core network node may operate as if the user equipment is monitoring paging according to the idle extended discontinuous reception cycle. This may lead to power being consumed unnecessarily when the core network pages according to the idle extended discontinuous reception cycle. In addition, there is unnecessary delay when the user equipment is monitoring more frequently than the core network is paging.

BRIEF SUMMARY

In one or more embodiments, a network node (120) is provided, including at least one processor and at least one memory storing instructions that, when executed by the processor, cause the network node (120) to transmit a network node configuration (340) to at least one other network node (130/140), wherein the network node configuration (340) defines at least one allowability status for at least an idle extended discontinuous reception (310). The network node (120) is further caused to receive a paging request from the at least one other network node (130/140).

In one or more embodiments, a core network node (130) is provided, including at least one processor and at least one memory storing instructions that, when executed by the processor, cause the core network node (130) to receive, from a network node (120), a network node configuration (340), wherein the network node configuration (340) defines at least one allowability status for at least one of idle extended discontinuous reception (310), inactive extended discontinuous reception (320), or inactive enhanced discontinuous reception (330). The core network node (130) is further caused to transmit, to the network node (120), a paging request.

In one or more embodiments, an anchor network node (140) is provided, including at least one processor and at least one memory storing instructions that, when executed by the processor, cause the anchor network node (140) to receive, from a network node (120), a network node configuration (340), wherein the network node configuration (340) defines at least one allowability status for at least one of idle extended discontinuous reception (310), inactive extended discontinuous reception (320) or inactive enhanced extended discontinuous reception (330). In one or more embodiments, the anchor network node (140) is further caused to transmit, to the network node (120), a paging request.

In one or more embodiments, a user equipment (110) is provided, including at least one processor and at least one memory storing instructions that, when executed by the processor, cause the user equipment (110) to determine (300) a user equipment configuration (300), wherein the user equipment configuration (300) includes at least one of idle extended discontinuous reception (310), inactive extended discontinuous reception (320), or inactive enhanced extended discontinuous reception (330). In one or more embodiments, the user equipment (110) is further caused to determine (340) a network node configuration (340), wherein the network node configuration (340) defines an allowability status for at least one of idle extended discontinuous reception (310), inactive extended discontinuous reception (320), or inactive enhanced extended discontinuous reception (330). In one or more embodiments, the user equipment (110) is further caused to determine (350) a discontinuous reception cycle (350) based at least on the user equipment configuration (300) and the network node configuration (340). In one or more embodiments, the user equipment (110) is further caused to receive a paging request based on the discontinuous reception cycle (350).

In one or more embodiments, a computer-implemented method is provided, including performing, by a network node (120), transmitting a network node configuration (340) to at least one other network node (130/140), wherein the network node configuration (340) defines at least one allowability status for at least an idle extended discontinuous reception (310). The computer-implemented method further includes receiving a paging request from the at least one other network node (130/140).

In one or more embodiments, a computer-implemented method is provided that is performed by a core network node (130) and includes receiving, from a network node (120), a network node configuration (340), wherein the network node configuration (340) defines at least one allowability status for at least one of idle extended discontinuous reception (310), inactive extended discontinuous reception (320), or inactive enhanced discontinuous reception (330). In one or more embodiments, the computer-implemented method further includes transmitting, to the network node (120), a paging request.

In one or more embodiments, a computer-implemented method is provided that is performed by an anchor network node (140) and includes receiving, from a network node (120), a network node configuration (340), wherein the network node configuration (340) defines at least one allowability status for at least one of idle extended discontinuous reception (310), inactive extended discontinuous reception (320) or inactive enhanced extended discontinuous reception (330). The computer-implemented method further includes transmitting, to the network node (120), a paging request.

In one or more embodiments, a computer-implemented method is provided that is performed by a user equipment (110) and includes determining (300) a user equipment configuration (300), wherein the user equipment configuration (300) includes at least one of idle extended discontinuous reception (310), inactive extended discontinuous reception (320), or inactive enhanced extended discontinuous reception (330). In one or more embodiments, the computer-implemented method further includes determining (340) a network node configuration (340), wherein the network node configuration (340) defines an allowability status for at least one of idle extended discontinuous reception (310), inactive extended discontinuous reception (320), or inactive enhanced extended discontinuous reception (330). In one or more embodiments, the computer-implemented method further includes determining (350) a discontinuous reception cycle (350) based at least on the user equipment configuration (300) and the network node configuration (340). In one or more embodiments, the computer-implemented method further includes receiving a paging request based on the discontinuous reception cycle (350).

In one or more embodiments, a non-transitory computer readable storage medium is provided including computer instructions that, when executed by a network node, cause the network node to transmit a network node configuration (340) to at least one other network node (130/140), wherein the network node configuration (340) defines at least one allowability status for at least an idle extended discontinuous reception (310). The network node (120) is further caused to receive a paging request from the at least one other network node (130/140).

In one or more embodiments, a non-transitory computer readable storage medium is provided including computer instructions that, when executed by a core network node, cause the core network node to receive, from a network node (120), a network node configuration (340), wherein the network node configuration (340) defines at least one allowability status for at least one of idle extended discontinuous reception (310), inactive extended discontinuous reception (320), or inactive enhanced discontinuous reception (330). The core network node (130) is further caused to transmit, to the network node (120), a paging request.

In one or more embodiments, a non-transitory computer readable storage medium is provided including computer instructions that, when executed by an anchor network node, cause the anchor network node to receive, from a network node (120), a network node configuration (340), wherein the network node configuration (340) defines at least one allowability status for at least one of idle extended discontinuous reception (310), inactive extended discontinuous reception (320) or inactive enhanced extended discontinuous reception (330). In one or more embodiments, the anchor network node (140) is further caused to transmit, to the network node (120), a paging request.

In one or more embodiments, a non-transitory computer readable storage medium is provided including computer instructions that, when executed by a user equipment, cause the user equipment to determine (300) a user equipment configuration (300), wherein the user equipment configuration (300) includes at least one of idle extended discontinuous reception (310), inactive extended discontinuous reception (320), or inactive enhanced extended discontinuous reception (330). In one or more embodiments, the user equipment (110) is further caused to determine (340) a network node configuration (340), wherein the network node configuration (340) defines an allowability status for at least one of idle extended discontinuous reception (310), inactive extended discontinuous reception (320), or inactive enhanced extended discontinuous reception (330). In one or more embodiments, the user equipment (110) is further caused to determine (350) a discontinuous reception cycle (350) based at least on the user equipment configuration (300) and the network node configuration (340). In one or more embodiments, the user equipment (110) is further caused to receive a paging request based on the discontinuous reception cycle (350).

In one or more embodiments, a network node is provided that includes means for transmitting a network node configuration (340) to at least one other network node (130/140), wherein the network node configuration (340) defines at least one allowability status for at least an idle extended discontinuous reception (310). The network node (120) further includes means for receiving a paging request from the at least one other network node (130/140).

In one or more embodiments, a core network node is provided that includes means for receiving, from a network node (120), a network node configuration (340), wherein the network node configuration (340) defines at least one allowability status for at least one of idle extended discontinuous reception (310), inactive extended discontinuous reception (320), or inactive enhanced discontinuous reception (330). The core network node further includes means for transmitting, to the network node (120), a paging request.

In one or more embodiments, an anchor network node is provided that includes means for receiving, from a network node (120), a network node configuration (340), wherein the network node configuration (340) defines at least one allowability status for at least one of idle extended discontinuous reception (310), inactive extended discontinuous reception (320) or inactive enhanced extended discontinuous reception (330). In one or more embodiments, the anchor network node (140) further includes means for transmitting, to the network node (120), a paging request.

In one or more embodiments, a user equipment is provided that includes means for determining (300) a user equipment configuration (300), wherein the user equipment configuration (300) includes at least one of idle extended discontinuous reception (310), inactive extended discontinuous reception (320), or inactive enhanced extended discontinuous reception (330). In one or more embodiments, the user equipment (110) further includes means for determining (340) a network node configuration (340), wherein the network node configuration (340) defines an allowability status for at least one of idle extended discontinuous reception (310), inactive extended discontinuous reception (320), or inactive enhanced extended discontinuous reception (330). In one or more embodiments, the user equipment (110) further includes means for determining (350) a discontinuous reception cycle (350) based at least on the user equipment configuration (300) and the network node configuration (340). In one or more embodiments, the user equipment (110) further includes means for receiving a paging request based on the discontinuous reception cycle (350).

BRIEF DESCRIPTION OF THE DRAWINGS

Figure 1:
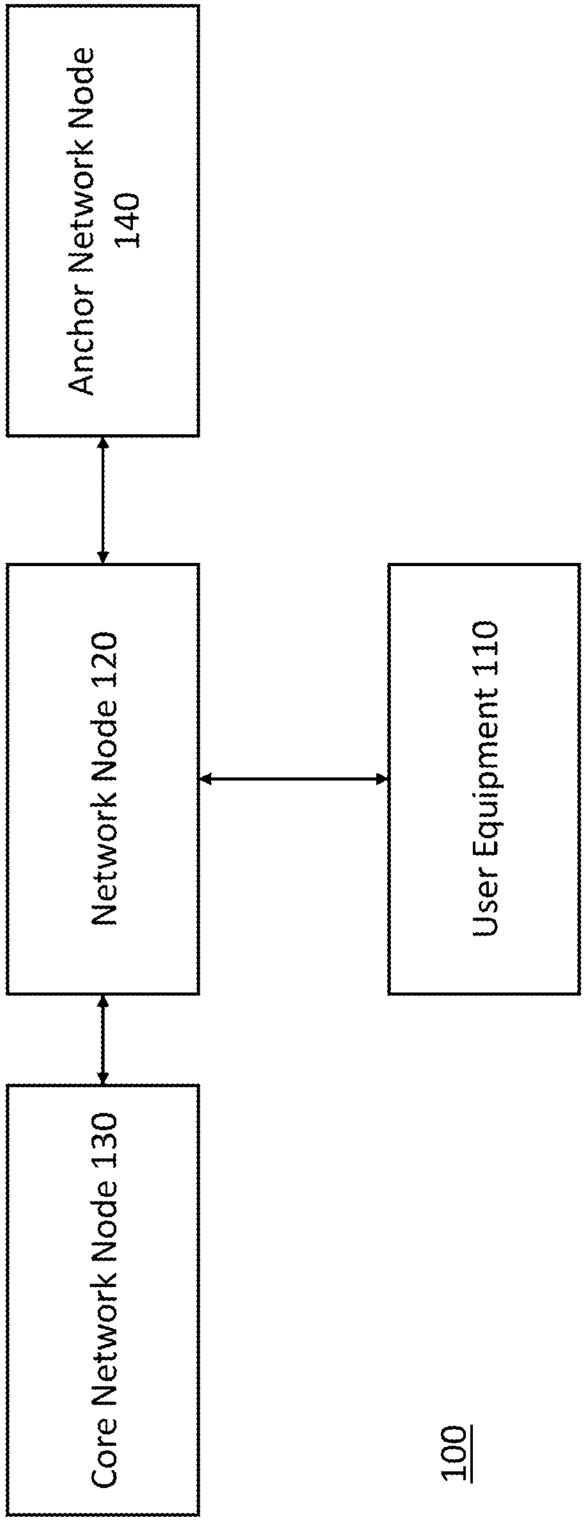

Having thus described certain example embodiments of the present disclosure in general terms, reference will hereinafter be made to the accompanying drawings, which are not necessarily drawn to scale, and wherein:

FIG. 1 is a block diagram of a system including both a base station and user equipment configured to communicate via at least uplink and downlink transmission in accordance with an example embodiment of the present disclosure.

Figure 2:
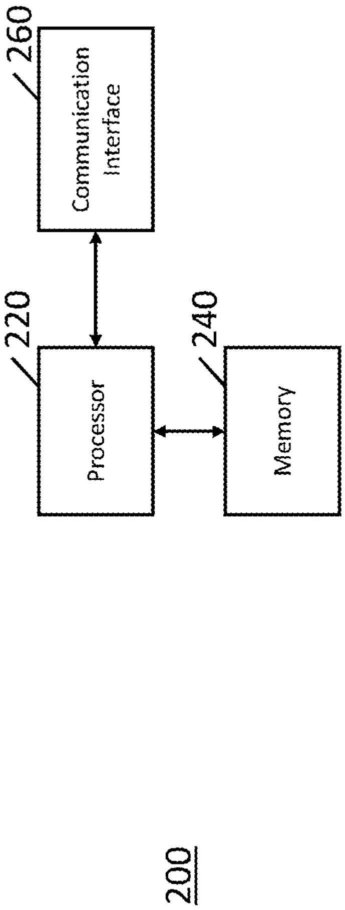

FIG. 2 is a block diagram of an example communication system in which the system of FIG. 1 may be deployed in accordance with an example embodiment of the present disclosure.

FIG. 3A is a table demonstrating paging handling when a user equipment has an idle extended discontinuous reception configuration in accordance with an example embodiment of the present disclosure.

FIG. 3B is a table demonstrating paging handling when a user equipment has an inactive extended discontinuous reception configuration in accordance with an example embodiment of the present disclosure.

FIG. 3C is a table demonstrating paging handling when a user equipment has an inactive enhanced extended discontinuous reception configuration in accordance with an example embodiment of the present disclosure.

FIG. 3D is a table demonstrating paging handling when a user equipment has both an inactive extended discontinuous reception configuration and an inactive enhanced extended discontinuous reception configuration in accordance with an example embodiment of the present disclosure.

Figure 4:
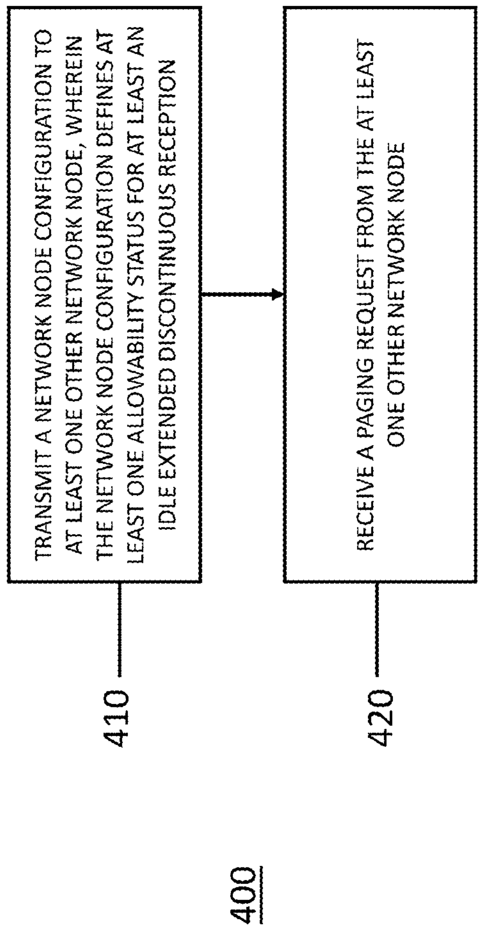

FIG. 4 is a flowchart demonstrating the operations performed, such as by a network node 120 in accordance with an example embodiment of the present disclosure.

Figure 5:
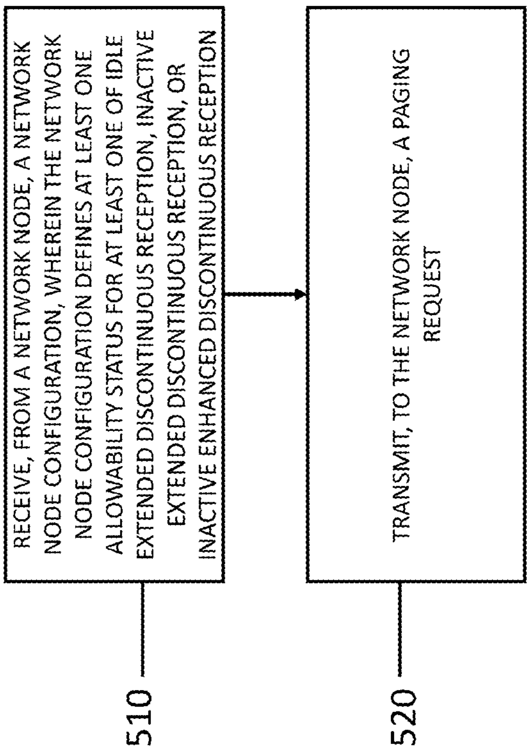

FIG. 5 is a flowchart demonstrating the operations performed, such as by a core network node 130 or an anchor network node 140 in accordance with an example embodiment of the present disclosure.

Figure 6:
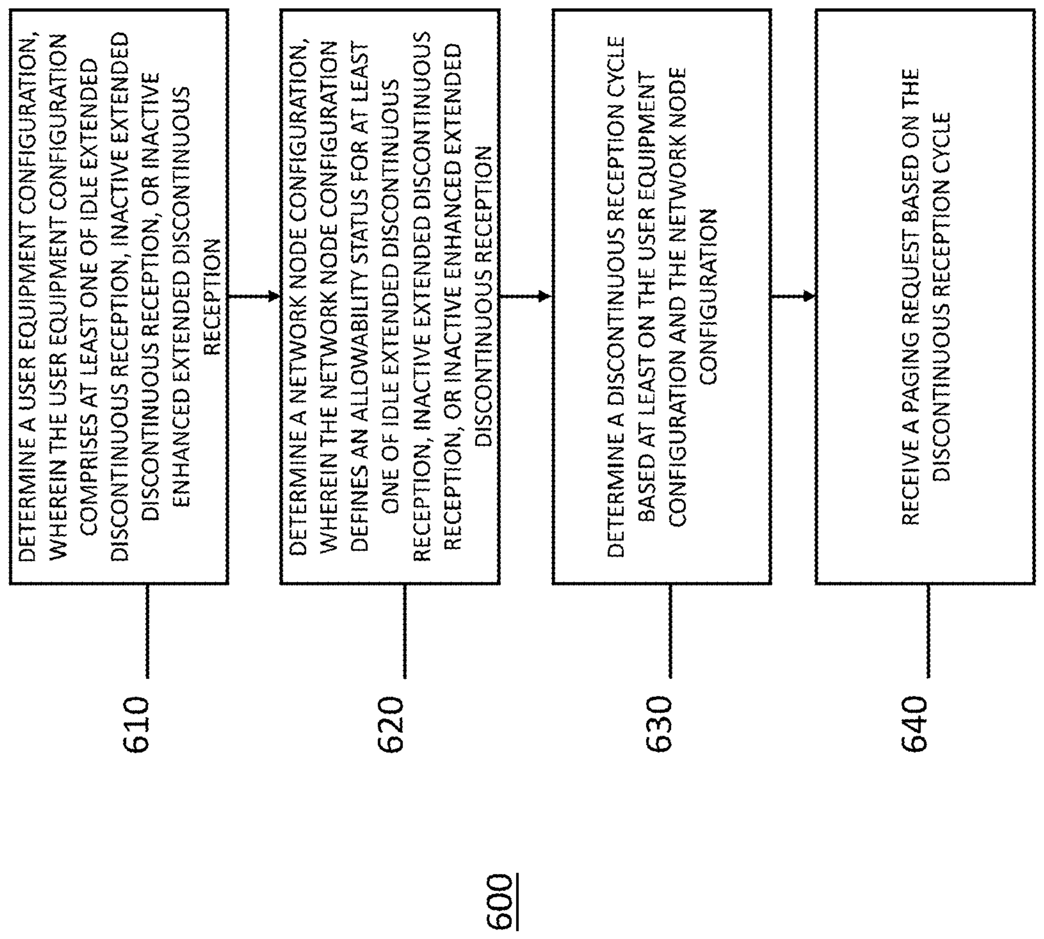

FIG. 6 is a flowchart demonstrating the operations performed, such as by a user equipment 110 in accordance with an example embodiment of the present disclosure.

DETAILED DESCRIPTION

Some embodiments of the present disclosure will now be described more fully hereinafter with reference to the accompanying drawings, in which some, but not all, embodiments are shown. Indeed, various embodiments may be embodied in many different forms and not to be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms not to be taken to limit the spirit and scope of embodiments of the present disclosure.

Additionally, as used herein, the term "circuitry" refers to (a) hardware-only circuit implementations (e.g., implementations in analog circuitry and/or digital circuitry); (b) combinations of circuits and computer program product(s) including software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation including one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

As used herein, the term "computer-readable medium" refers to non-transitory storage hardware, non-transitory storage device or non-transitory computer system memory that may be accessed by a controller, a microcontroller, a computational system or a module of a computational system to encored thereon computer-executable instructions or software programs. A non-transitory "computer readable medium" may be accessed by a computational system or a module of a computational system to retrieve and/or execute the computer-executable instructions or software programs encoded on the medium. Examples of non-transitory computer-readable media may include, but are not limited to, one or more types of hardware memory, non-transitory tangible media (for example, one or more magnetic storage disks, one or more optical disks, one or more universal synchronous bus (USB) flash drives), computer system memory or random-access memory (such as dynamic random access memory (DRAM), static random access memory (SRAM), extended data out random access memory (EDO RAM), and the like.

The inventors have identified methods for optimizing paging of a user equipment such that the user equipment such that the user equipment is paged in each cell of its radio access network or tracking area based on the discontinuous reception cycle it is using. For example, this may improve energy efficiency of a user equipment.

As illustrated in FIG. 1, a system 100 is provided in accordance with an example embodiment in order to perform event reporting. Although the system may be configured in various manners, the system of one embodiment is depicted in FIG. 1 and includes user equipment 110, network node 120, core network entity 130, and anchor network entity 140 configured to communicate via at least uplink and downlink transmission and reception beams. Although one user equipment, two network nodes, and one core network node is depicted, the system may include and the user equipment 110, network node 120, core network node 140, and anchor network node 140 may communicate with additional user equipment, network nodes, and core network nodes in other embodiments. In one or more embodiments, the user equipment 110, network node 120, core network node 130, and anchor network node 140 may configured to support, for example, 5G, 5G advanced, or 6G. In one or more embodiments, the system 100 may support carrier aggregation and/or dual connectivity. As described below, the system is configured to transmit a variety of requests, signals, reports, and/or configurations.

The data that is transmitted between the user equipment 110, network node 120, core network node 130, and the anchor network node 140 can be any of a wide variety of data including, but not limited to digital imagery data including video data, audio data as well as data provided by sensors, radars, telescopes and radio receivers. In at least some instances, the data is encoded prior to communication of the data via the uplink and downlink beams and decoded upon reception. The resulting data received may be utilized for a variety of purposes including presentation to a user, storage of the data for subsequent use and/or provision of the data to one or more applications, such as applications that perform statistical inference on the data for various purposes including object recognition, image classification, spectrum sensing, speech transcription and/or prediction or detection of events.

The user equipment 110 of FIG. 1 (also called UE, user device, user terminal, terminal device, etc.) illustrates a type of an apparatus which resources on an air interface are allocated and assigned. The user equipment 110 typically refers to a portable computing device that includes wireless mobile communication devices operating with or without a subscriber identification module (SIM), including, but not limited to, the following types of devices: a mobile station (mobile phone), smartphone, personal digital assistance (PDA), handset, device using a wireless modem (alarm or measurement device, etc.), laptop and/or touch screen computer, tablet, game console, notebook, and multimedia device. User equipment 110 may also be a device having capability to operate in Internet of Things (IoT) network which is a scenario in which objects are provided with the ability to transfer data over a network without requiring human-to-human or human-to-computer interaction. User equipment 110 is configured to perform one or more of user equipment functionalities. The user equipment 110 may also be called a subscriber unit, mobile station, remote terminal, access terminal, user terminal, or user equipment (UE) just to mention but a few names or apparatuses.

The network node 120 and the anchor network node 130 of FIG. 1 may comprise, for example, base stations such as remote radio heads (RRHs), transmission reception points (TRPs), access points, node Bs (e.g., gNB), radio access network (RAN) nodes or other transmission sources. The network node 120 and the anchor network node 140 may be configured to communicate with user equipment 110 via a network.

The core network node 130 may comprise an access and mobility management function (AMF). Core network entity 140 may be configured to communicate with any of user equipment 110, distributed network entity 120, and central network entity 130.

FIG. 2 depicts an example apparatus 200 that may be configured to function as user equipment 110, network node 120, core network node 130, and/or anchor network node 140. As shown in FIG. 2, the apparatus includes, is associated with, or is in communications with processing circuitry 220, a memory 240, and a communication interface 260. The processing circuitry 220 may be in communication with the memory device 240 via a bus for passing information among components of the apparatus. The memory device may be non-transitory and may include, for example, one or more volatile and/or non-volatile memories. In other words, for example, the memory device may be an electronic storage device (e.g., a computer readable storage medium) including gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 200 may, in some embodiments, be embodied in various computing devices described as above. However, in some embodiments, the apparatus may be embodied as a chip or chip set. In other words, the apparatus may include one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment on a single chip or as a single "system on a chip." As such, in some cases, a chip or chipset may constitute means for performing one or more operations for providing the functionalities described herein.

The processing circuitry 220, also referenced as a processor, may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining, and/or multithreading.

In an example embodiment, the processing circuitry 220 may be configured to execute instructions stored in the memory device 240 or otherwise accessible to the processing circuitry. Alternatively or additionally, the processing circuitry may be configured to execute hardcoded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 260 may be any means such as a device or circuitry embodied in either hardware or a combination of hardware and software that is configured to receive and/or transmit data including media content in the form of video or image files, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communications interface may alternatively or also support wired communication. As such, for example, the communication interface may include a communication modem and/or other hardware/software for supporting communication via cable, digital subscriber line (DSL), universal serial bus (USB) or other mechanisms.

Turning now to FIG. 3A, a table demonstrating paging handling when a user equipment has an idle extended discontinuous reception configuration (RRC_IDLE) is provided in accordance with an example embodiment of the present disclosure. As shown FIG. 3A, a user equipment 110 may have a user equipment configuration 300 of idle extended discontinuous reception 310. In some examples, for RRC_IDLE, extended discontinuous reception for core network paging is configured by upper layers. In some examples, in RRC_IDLE, a user equipment 110 may monitor only core network paging. In some examples, user equipment 110 monitors paging channels for core network-initiated paging. In some examples, paging discontinuous reception is defined where the user equipment in RRC_IDLE is only required to monitor paging channels during one paging occasion per discontinuous reception cycle. In some examples, for core network-initiated paging, a default cycle broadcast in system information or a user equipment-specific cycle configurated via non access stratum (NAS) signaling may be used. In some examples, user equipment 110 will use the shortest of the available cycles.

In one or more embodiments, network node 120 may allow and/or not allow extended discontinuous reception for idle mode 310 in its cell(s). In some examples, the network node indicates 340 this to at least one other network node, such as core network node 130 and/or anchor network node 140. For example, network node 120 may indicate 340 that extended discontinuous reception for idle mode is allowed in its cell(s) by broadcasting eDRX-AllowedIdle. As another example, network node 120 may indicate 340 that extended discontinuous reception for idle mode 310 is not allowed in its cell(s) by not broadcasting eDRX-AllowedIdle. In some examples, information on whether extended discontinuous reception for core network and/or radio access network paging is allowed on a cell is provided separately in system information. In some examples, the indication 340 can be cell specific or gNB specific. In some examples, the indication 340 communicates an allowability status for idle extended discontinuous reception 310.

In some examples, network node 120 indicates that it has cell(s) that do not allow idle extended discontinuous reception 310 and/or cell(s) that do allow idle extended discontinuous reception 310. Based on this information, in some examples, the at least one other network node 130/140 will transmit a paging request to network node 120 based on whether it allows extended discontinuous reception for idle mode 310 or not. In some examples, if the network node 120 does not allow idle extended discontinuous reception 310, the core network node 130 and/or the anchor network node 140 transmits a paging request of a user equipment 110 at once to network node 120 (or close to the next paging occasion (PO)). In the example where idle extended discontinuous reception 310 is not allowed, the user equipment 110 operates with a discontinuous reception 370 cycle. In one example, if the network node 120 allows idle extended discontinuous reception mode 310, core network node 130 and/or anchor network node 140 transmits a paging request of a user equipment 110 to the network node 120 only before the paging occasion which is calculated based on an idle extended discontinuous reception 310 cycle of the user equipment 110.

In one or more embodiments, a core network node 130 and/or an anchor network node 140 transmits a paging request to a network node 120 that does not allow idle extended discontinuous reception 310 also upon transmitting the paging request to a second network node that allows idle extended discontinuous reception 310. In other words, in one example, the paging of a user equipment 110 may be requested twice (or more) from network node(s) 120 that do not allow idle extended discontinuous reception 310 in their cell(s).

Turning now to FIG. 3B, a table demonstrating paging handling when a user equipment has an inactive extended discontinuous reception configuration (RRC_INACTIVE) is provided in accordance with an example embodiment of the present disclosure. As shown FIG. 3B, a user equipment 110 may have a user equipment configuration 300 of inactive extended discontinuous reception 320. In some examples, for RRC_INACTIVE, extended discontinuous reception for radio access network paging is decided and configured by next generation radio access network (NG-RAN). In some examples, in RRC_INACTIVE, a user equipment 110 may monitor both radio access network and core network paging. In some examples, with no ongoing small data transmission (SDT) procedure user equipment 110 monitors paging channels for core network-initiated and radio access network-initiated paging. In some examples, paging discontinuous reception is defined where the user equipment in RRC_INACTIVE is only required to monitor paging channels during one paging occasion per discontinuous reception cycle. In some examples, for core network-initiated paging, a default cycle broadcast in system information or a user equipment-specific cycle configurated via non access stratum (NAS) signaling may be used. In some examples, for radio access network-initiated paging, a user equipment-specific cycle configurated via radio resource control (RRC) signaling may be used. In some examples, user equipment 110 will use the shortest of the available cycles.

In one or more embodiments, network node 120 may allow and/or not allow extended discontinuous reception for inactive mode 320 in its cell(s). In some examples, the network node indicates 340 this to at least one other network node, such as core network node 130 and/or anchor network node 140. For example, network node 120 may indicate 340 that extended discontinuous reception for inactive mode 320 is allowed in its cell(s) by broadcasting eDRX-AllowedInactive. As another example, network node 120 may indicate 340 that extended discontinuous reception for inactive mode 320 is not allowed in its cell(s) by not broadcasting eDRX-AllowedInactive. In some examples, information on whether extended discontinuous reception for core network and/or radio access network paging is allowed ona cell is provided separately in system information. In some examples, the indication 340 can be cell specific or gNB specific. In some examples, the indication 340 communicates an allowability status for inactive extended discontinuous reception 320.

In some examples, network node 120 indicates that it has cell(s) that do not allow inactive extended discontinuous reception 320 and/or cell(s) that do allow inactive extended discontinuous reception 320. Based on this information, in some examples, the at least one other network node 130/140 will transmit a paging request to network node 120 based on whether it allows extended discontinuous reception for inactive mode 320 or not. In some examples, if the network node 120 does not allow inactive extended discontinuous reception 320, the core network node 130 and/or the anchor network node 140 transmits a paging request of a user equipment 110 at once to network node 120 (or close to the next paging occasion). In the example where inactive extended discontinuous reception 320 is not allowed, the user equipment 110 operates with an inactive discontinuous reception 380 cycle. In one example, if the network node 120 allows inactive extended discontinuous reception mode 320, core network node 130 and/or anchor network node 140 transmits a paging request of a user equipment 110 to the network node 120 only before the paging occasion which is calculated based on an inactive extended discontinuous reception 320 cycle of the user equipment 110.

In one or more embodiments, a core network node 130 and/or an anchor network node 140 transmits a paging request to a network node 120 that does not allow inactive extended discontinuous reception 320 also upon transmitting the paging request to a second network node that allows inactive extended discontinuous reception 320. In other words, in one example, the paging of a user equipment 110 may be requested twice (or more) from network node(s) 120 that do not allow inactive extended discontinuous reception 320 in their cell(s).

Turning now to FIG. 3C, a table demonstrating paging handling when a user equipment has an inactive enhanced extended discontinuous reception configuration is provided in accordance with an example embodiment of the present disclosure. As shown FIG. 3C, a user equipment 110 may have a user equipment configuration 300 of inactive enhanced extended discontinuous reception 330. In some examples, for RRC_INACTIVE, extended discontinuous reception for radio access network paging is decided and configured by next generation radio access network (NG-RAN). In some examples, in RRC_INACTIVE, a user equipment 110 may monitor both radio access network and core network paging. In some examples, with no ongoing small data transmission (SDT) procedure user equipment 110 monitors paging channels for core network-initiated and radio access network-initiated paging. In some examples, paging discontinuous reception is defined where the user equipment in RRC_INACTIVE is only required to monitor paging channels during one paging occasion per discontinuous reception cycle. In some examples, for core network-initiated paging, a default cycle broadcast in system information or a user equipment-specific cycle configurated via non access stratum (NAS) signaling may be used. In some examples, for radio access network-initiated paging, a user equipment-specific cycle configurated via radio resource control (RRC) signaling may be used. In some examples, user equipment 110 will use the shortest of the available cycles.

In one or more embodiments, network node 120 may allow and/or not allow enhanced extended discontinuous reception for inactive mode 330 in its cell(s). In some examples, the network node indicates 340 this to at least one other network node, such as core network node 130 and/or anchor network node 140. For example, network node 120 may indicate 340 that enhanced extended discontinuous reception for inactive mode 330 is allowed in its cell(s) by broadcasting enhanced-eDRX-AllowedInactive. As another example, network node 120 may indicate 340 that enhanced extended discontinuous reception for inactive mode 330 is not allowed in its cell(s) by not broadcasting enhanced-cDRX-AllowedInactive. In some examples, information on whether extended discontinuous reception for core network and/or radio access network paging is allowed ona cell is provided separately in system information. In some examples, the indication 340 can be cell specific or gNB specific. In some examples, the indication 340 communicates an allowability status for inactive enhanced extended discontinuous reception 330.

In some examples, network node 120 indicates that it has cell(s) that do not allow inactive enhanced extended discontinuous reception 330 and/or cell(s) that do allow inactive enhanced extended discontinuous reception 330. Based on this information, in some examples, the at least one other network node 130/140 will transmit a paging request to network node 120 based on whether it allows extended enhanced discontinuous reception for inactive mode 330 or not. In some examples, if the network node 120 does not allow inactive enhanced extended discontinuous reception 330, the core network node 130 and/or the anchor network node 140 transmits a paging request of a user equipment 110 at once to network node 120 (or close to the next paging occasion). In the example where inactive enhanced extended discontinuous reception 330 is not allowed, the user equipment 110 operates with an inactive discontinuous reception 380 cycle. In one example, if the network node 120 allows inactive enhanced extended discontinuous reception mode 330, core network node 130 and/or anchor network node 140 transmits a paging request of a user equipment 110 to the network node 120 only before the paging occasion which is calculated based on an inactive enhanced extended discontinuous reception 330 cycle of the user equipment 110.

In one or more embodiments, a core network node 130 and/or an anchor network node 140 transmits a paging request to a network node 120 that does not allow inactive enhanced extended discontinuous reception 330 also upon transmitting the paging request to a second network node that allows inactive enhanced extended discontinuous reception 330. In other words, in one example, the paging of a user equipment 110 may be requested twice (or more) from network node(s) 120 that do not allow inactive enhanced extended discontinuous reception 330 in their cell(s).

Turning now to FIG. 3D, a table demonstrating paging handling when a user equipment has both 360 an inactive extended discontinuous reception configuration and an inactive enhanced extended discontinuous reception configuration is provided in accordance with an example embodiment of the present disclosure. As shown FIG. 3C, a user equipment 110 may have both 360 an inactive extended discontinuous reception configuration 320 and a user equipment configuration 300 of inactive enhanced extended discontinuous reception 330. In some examples, for RRC_INACTIVE, extended discontinuous reception for radio access network paging is decided and configured by next generation radio access network (NG-RAN). In some examples, in RRC_INACTIVE, a user equipment 110 may monitor both radio access network and core network paging. In some examples, with no ongoing small data transmission (SDT) procedure user equipment 110 monitors paging channels for core network-initiated and radio access network-initiated paging. In some examples, paging discontinuous reception is defined where the user equipment in RRC_INACTIVE is only required to monitor paging channels during one paging occasion per discontinuous reception cycle. In some examples, for core network-initiated paging, a default cycle broadcast in system information or a user equipment-specific cycle configurated via non access stratum (NAS) signaling may be used. In some examples, for radio access network-initiated paging, a user equipment-specific cycle configurated via radio resource control (RRC) signaling may be used. In some examples, user equipment 110 will use the shortest of the available cycles.

In one or more embodiments, network node 120 may allow and/or not allow enhanced an inactive extended discontinuous reception for inactive mode 320 and/or extended discontinuous reception for inactive mode 330 in its cell(s). In some examples, the network node indicates 340 this to at least one other network node, such as core network node 130 and/or anchor network node 140. For example, network node 120 may indicate 340 that both 360 an inactive extended discontinuous reception configuration 320 and enhanced extended discontinuous reception for inactive mode 330 is allowed in its cell(s) by broadcasting eDRX- AllowedInactive and enhanced-eDRX-AllowedInactive. As another example, network node 120 may indicate 340 that neither extended discontinuous reception for inactive mode 320 nor enhanced extended discontinuous reception for inactive mode 330 is not allowed in its cell(s) by not broadcasting eDRX-AllowedInactive and enhanced-eDRX-AllowedInactive. As another example, network node 120 may indicate 340 that extended discontinuous reception for inactive mode 320 but not enhanced extended discontinuous reception for inactive mode 330 is allowed in its cell(s) by broadcasting eDRX-AllowedInactive but not enhanced-eDRX-Allowed-Inactive. As another example, network node 120 may indicate 340 that enhanced extended discontinuous reception for inactive mode 330 but not extended discontinuous reception for inactive mode 320 is allowed in its cell(s) by broadcasting enhanced-eDRX-AllowedInactive. In some examples, information on whether extended discontinuous reception for core network and/or radio access network paging is allowed ona cell is provided separately in system information. In some examples, the indication 340 can be cell specific or gNB specific. In some examples, the indication 340 communicates an allowability status for both 360 inactive extended discontinuous reception 320 and inactive enhanced extended discontinuous reception 330.

In some examples, network node 120 indicates that it has cell(s) that do or do not allow inactive extended discontinuous reception 320 and inactive enhanced extended discontinuous reception 330. Based on this information, in some examples, the at least one other network node 130/140 will transmit a paging request to network node 120 based on whether it allows extended discontinuous reception for idle mode 320 and/or extended enhanced discontinuous reception for inactive mode 330. In some examples, if the network node 120 allows neither inactive extended discontinuous reception 320 nor inactive enhanced extended discontinuous reception 330, the core network node 130 and/or the anchor network node 140 transmits a paging request of a user equipment 110 at once to network node 120 (or close to the next paging occasion). In the example where neither inactive extended discontinuous reception 320 nor inactive enhanced extended discontinuous reception 330 is allowed, the user equipment 110 operates with an inactive discontinuous reception 380 cycle. In an example where inactive enhanced extended discontinuous reception 330 is allowed, the user equipment 110 operates with inactive enhanced extended discontinuous reception 330 whether or not inactive extended discontinuous reception 320 is allowed. In an example where inactive extended discontinuous reception 320 is allowed but inactive enhanced extended discontinuous reception 330 is not allowed, the user equipment 110 operates with inactive extended discontinuous reception 320. In one example, if the network node 120 allows both 360 an inactive extended discontinuous reception configuration 320 and inactive enhanced extended discontinuous reception mode 330, core network node 130 and/or anchor network node 140 transmits a paging request of a user equipment 110 to the network node 120 only before the paging occasion which is calculated based on an inactive enhanced extended discontinuous reception 330 cycle of the user equipment 110.

In one or more embodiments, a core network node 130 and/or an anchor network node 140 transmits a paging request to a network node 120 that does not allow both 360 an inactive extended discontinuous reception configuration 320 and inactive enhanced extended discontinuous reception 330 also upon transmitting the paging request to a second network node that allows an inactive extended discontinuous reception configuration 320 and/or inactive enhanced extended discontinuous reception 330. In other words, in one example, the paging of a user equipment 110 may be requested twice (or more) from network node(s) 120 that do not allow inactive extended discontinuous reception 320 and/or inactive enhanced extended discontinuous reception 330 in their cell(s).

In one or more embodiments, paging failure is not declared by the network (e.g., core network node 130 and/or anchor node 140) if a network node 120 which does not allow extended discontinuous reception did not reach the user equipment 110 upon paging. In some examples, the paging failure is only declared after the user equipment 110 has been paged based on the longest extended discontinuous reception cycle the user equipment 110 is configured with (e.g., idle extended discontinuous reception 310, inactive extended discontinuous reception 320, and/or inactive enhanced extended discontinuous reception 330).

Turning now to FIG. 4, an example flowchart is illustrated for a process 400 performed by an apparatus embodied by, associated with or otherwise in communication with (hereinafter generally referenced as being embodied by) a network node 120 in order to receive a paging request from at least one other network node.

As shown in block 410 of FIG. 4, the apparatus embodied by the network node 120 includes means, such as the processing circuitry 220, the communication interface 260, or the like, for transmitting a network node configuration (340) to at least one other network node (130/140), wherein the network node configuration (340) defines at least one allowability status for at least an idle extended discontinuous reception (310). In one or more embodiments, the network node (120) comprises at least: a base station, a radio access network (RAN) node, or a gNB, and the at least one other network node (130/140) that comprises a core network that further comprises at least an access mobility and management function (AMF). In one or more embodiments, the network configuration (340) further defines an allowability status for inactive extended discontinuous reception (320) or an inactive enhanced extended discontinuous reception (330). In one or more embodiments, the network node configuration (340) defines one or more allowability statuses associated with a plurality of cells.

As shown in block 420 of FIG. 4, the apparatus embodied by the network node 120 includes means, such as the processing circuitry 220, the communication interface 260, or the like, for receiving a paging request from the at least one other network node (130/140). In one or more embodiments, the receiving of the paging request from the at least one other network node (130/140) is based at least on the network node configuration (340). In one or more embodiments, when the network node configuration (340) defines the at least one allowability status as the idle extended discontinuous reception (310) is not allowed, the network node (120) receives the paging request at once. In one or more embodiments, the network node (120) receives the paging request from the at least one other network node (130/140), when a second network node that allows idle extended discontinuous reception (310) receives the paging request. In one or more embodiments, when the network node configuration (340) defines the at least one allowability status as the idle extended discontinuous reception (310) is allowed, the network node (120) receives the paging request only before a next paging occasion which is calculated based on an idle extended discontinuous reception (310) cycle of the user equipment (110). In one or more embodiments, when the network node configuration (340) defines the at least one allowability status as the inactive extended discontinuous reception (320) is not allowed, the network node (120) receives the paging request at once. In one or more embodiments, the network node (120) receives the paging request from the at least one other network node (130/140) when a second network node (130/140) that allows inactive extended discontinuous reception (320) receives the paging request. In one or more embodiments, when the network node configuration (340) defines the at least one allowability status as the inactive extended discontinuous reception (320) is allowed, the network node (120) receives the paging request from the at least one other network node (130/140) only before a next paging occasion which is calculated based on an inactive extended discontinuous reception (320) cycle of a user equipment (110). In one or more embodiments, when the network node configuration (340) defines the at least one allowability status as the inactive enhanced extended discontinuous reception (330) is not allowed, the network node (120) receives the paging request at once. In one or more embodiments, the network node (120) receives the paging request from the at least one other network node (130/140) when a second network node that allows inactive enhanced extended discontinuous reception (330) receives the paging request. In one or more embodiments, when the network node configuration (340) defines the at least one allowability status as the inactive enhanced extended discontinuous reception (330) is allowed, the network node (120) receives the paging request only before a next paging occasion which is calculated based on an inactive enhanced extended discontinuous reception (330) cycle of a user equipment (110).

Turning now to FIG. 5, an example flowchart is illustrated for a process 500 performed by an apparatus embodied by, associated with or otherwise in communication with (hereinafter generally referenced as being embodied by) a core network node 130 and/or an anchor network node 140 in order to transmit a paging request to a network node.

As shown in block 510 of FIG. 5, the apparatus embodied by the core network node 130 and/or the anchor network node 140 includes means, such as the processing circuitry 220, the communication interface 260, or the like, for receiving, from a network node (120), a network node configuration (340), wherein the network node configuration (340) defines at least one allowability status for at least one of idle extended discontinuous reception (310), inactive extended discontinuous reception (320), or inactive enhanced discontinuous reception (330). In one or more embodiments, the core network node (130) comprises at least an access mobility and management function (AMF), and the network node (120) comprises at least: a base station, a radio access network (RAN) node, or a gNB.

As shown in block 520 of FIG. 5, the apparatus embodied by the core network node 130 and/or the anchor network node 140 includes means, such as the processing circuitry 220, the communication interface 260, or the like, for transmitting, to the network node (120), a paging request. In one or more embodiments, the transmitting of the paging request to the network node (120) is based at least on the network node configuration (340). In one or more embodiments, when the network node configuration (340) defines the at least one allowability status as the idle extended discontinuous reception (310) is not allowed, the core network node (130) and/or the anchor network node (140) transmits the paging request at once. In one or more embodiments, the core network node (130) and/or the anchor network node (140) are caused to transmit, to the network node (120), the paging request when transmitting the paging request to a second network node that allows idle extended discontinuous reception (310). In one or more embodiments, when the network node configuration (340) defines the at least one allowability status as the idle extended discontinuous reception (310) is allowed, the core network node (130) and/or the anchor network node (140) transmits the paging request only before a next paging occasion calculated based on an idle extended discontinuous reception (310) cycle of a user equipment (110). In one or more embodiments, when the network node configuration (340) defines the at least one allowability status as the inactive extended discontinuous reception (320) is not allowed, the core network node (130) and/or the anchor network node (140) transmits the paging request at once. In one or more embodiments, the core network node (130) and/or the anchor network node (140) is caused to transmit, to the network node (120), the paging request when transmitting the paging request to a second network node that allows inactive extended discontinuous reception (320). In one or more embodiments, when the network node configuration (340) defines the at least one allowability status as the inactive extended discontinuous reception (320) is allowed, the core network node (130) and/or the anchor network node (140) transmits the paging request only before a next paging occasion which is calculated based on an inactive extended discontinuous reception (320) cycle of a user equipment (110). In one or more embodiments, when the network node configuration (340) defines the at least one allowability status as the inactive enhanced extended discontinuous reception (330) is not allowed, the core network node (130) and/or the anchor network node (140) transmits the paging request at once. In one or more embodiments, the core network node (130) and/or the anchor network node (140) is caused to transmit, to the network node (120), the paging request when transmitting the paging request to a second network node that allows inactive enhanced extended discontinuous reception (330). In one or more embodiments, when the network node configuration (340) defines the at least one allowability status as the inactive enhanced extended discontinuous reception (330) is allowed, the core network node (130) and/or the anchor network node (140) transmits the paging request only before a next paging occasion which is calculated based on an inactive enhanced extended discontinuous reception (330) cycle of a user equipment (110).

Turning now to FIG. 6, an example flowchart is illustrated for a process 600 performed by an apparatus embodied by, associated with or otherwise in communication with (hereinafter generally referenced as being embodied by) a user equipment 110 in order to receive a paging request based on the discontinuous reception cycle.

As shown in block 610 of FIG. 6, the apparatus embodied by the user equipment 110 includes means, such as the processing circuitry 220, the communication interface 260, or the like, for determining (300) a user equipment configuration (300), wherein the user equipment configuration (300) comprises at least one of idle extended discontinuous reception (310), inactive extended discontinuous reception (320), or inactive enhanced extended discontinuous reception (330).

As shown in block 620 of FIG. 6, the apparatus embodied by the user equipment 110 includes means, such as the processing circuitry 220, the communication interface 260, or the like, for determining (340) a network node configuration (340), wherein the network node configuration (340) defines an allowability status for at least one of idle extended discontinuous reception (310), inactive extended discontinuous reception (320), or inactive enhanced extended discontinuous reception (330). In one or more embodiments, the network node configuration (340) is specific to a network node (120). In one or more embodiments, the network node configuration (340) is specific to a cell.

As shown in block 630 of FIG. 6, the apparatus embodied by the user equipment 110 includes means, such as the processing circuitry 220, the communication interface 260, or the like, for determining (350) a discontinuous reception cycle (350) based at least on the user equipment configuration (300) and the network node configuration (340). In one or more embodiments, when the user equipment configuration (300) comprises idle extended discontinuous reception (310), and when the network node configuration (340) defines the allowability status as idle extended discontinuous reception (310) is allowed, the discontinuous reception cycle (350) is set to the idle extended discontinuous reception (310). In one or more embodiments, when the user equipment configuration (300) comprises idle extended discontinuous reception (310), and when the network node configuration (340) defines the allowability status as idle extended discontinuous reception (310) is not allowed, the discontinuous reception cycle (350) is set to the discontinuous reception (370). In one or more embodiments, when the user equipment configuration (300) includes inactive extended discontinuous reception (320) and not inactive enhanced extended discontinuous reception (330), and when the network node configuration (340) defines the allowability status as inactive extended discontinuous reception (320) is allowed, the discontinuous reception cycle (350) is set to inactive extended discontinuous reception (320). In one or more embodiments, when the user equipment configuration (300) includes inactive extended discontinuous reception (320) and not inactive enhanced extended discontinuous reception (330), and when the network node configuration (340) defines the allowability status as inactive extended discontinuous reception (320) is not allowed, the discontinuous reception cycle (350) is set to inactive discontinuous reception (380). In one or more embodiments, when the user equipment configuration (300) includes inactive enhanced extended discontinuous reception (330) and not inactive extended discontinuous reception (320), and when the network node configuration (340) defines the allowability status as inactive enhanced extended discontinuous reception (330) is allowed, the discontinuous reception cycle (350) is set to inactive enhanced discontinuous reception. In one or more embodiments, when the user equipment configuration (300) includes inactive enhanced extended discontinuous reception (330) and not inactive extended discontinuous reception (320), and when the network node configuration (340) defines the allowability status as inactive enhanced extended discontinuous reception (330) is not allowed, the discontinuous reception cycle (350) is set to inactive discontinuous reception (380). In one or more embodiments, when the user equipment configuration (300) includes both (360) inactive extended discontinuous reception (320) and inactive enhanced extended discontinuous reception (330), and when the network node configuration (340) defines the allowability status as inactive enhanced extended discontinuous reception (330) is not allowed and inactive extended discontinuous reception (320) is not allowed, the discontinuous reception cycle (350) is set to inactive discontinuous reception (380). In one or more embodiments, when the user equipment configuration (300) includes both (360) inactive extended discontinuous reception (320) and inactive enhanced extended discontinuous reception (330), and when the network node configuration (340) defines the allowability status as inactive enhanced extended discontinuous reception (330) is allowed and inactive extended discontinuous reception (320) is not allowed, the discontinuous reception cycle (350) is set to inactive enhanced extended discontinuous reception (330). In one or more embodiments, when the user equipment configuration (300) includes both (360) inactive extended discontinuous reception (320) and inactive enhanced extended discontinuous reception (330), and when the network node configuration (340) defines the allowability status as inactive enhanced extended discontinuous reception (330) is not allowed and inactive extended discontinuous reception (320) is allowed, the discontinuous reception cycle (350) is set to inactive extended discontinuous reception (320). In one or more embodiments, when the user equipment configuration (300) includes both (360) inactive extended discontinuous reception (320) and inactive enhanced extended discontinuous reception (330), and when the network node configuration (340) defines the allowability status as inactive enhanced extended discontinuous reception (330) is allowed and inactive extended discontinuous reception (320) is allowed, the discontinuous reception cycle (350) is set to inactive enhanced extended discontinuous reception (330).

As shown in block 640 of FIG. 6, the apparatus embodied by the user equipment 110 includes means, such as the processing circuitry 220, the communication interface 260, or the like, for receiving a paging request based on the discontinuous reception cycle (350). In one or more embodiments, paging failure is only declared after the user equipment (110) has been paged based on the longest extended discontinuous reception cycle (350) the user equipment (110) is configured with.

FIGS. 4-6 illustrate flowcharts depicting methods according to an example embodiment of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 240 of an apparatus employing an embodiment and executed by a processor 220. As will be appreciated, any such computer program instructions may be loaded into a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded into a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In one or more embodiments, a network node (120) is provided, including at least one processor and at least one memory storing instructions that, when executed by the processor, cause the network node (120) to transmit a network node configuration (340) to at least one other network node (130/140), wherein the network node configuration (340) defines at least one allowability status for at least an idle extended discontinuous reception (310). The network node (120) is further caused to receive a paging request from the at least one other network node (130/140).

In one or more embodiments, the network node (120) includes at least: a base station, a radio access network (RAN) node, or a gNB, and the at least one other network node (130/140) that includes a core network that further includes at least an access mobility and management function (AMF).

In one or more embodiments, the receiving of the paging request from the at least one other network node (130/140) is based at least on the network node configuration (340).

In one or more embodiments, the network configuration (340) further defines an allowability status for inactive extended discontinuous reception (320) or an inactive enhanced extended discontinuous reception (330).

In one or more embodiments, the network node configuration (340) defines one or more allowability statuses associated with a plurality of cells.

In one or more embodiments, when the network node configuration (340) defines the at least one allowability status as the idle extended discontinuous reception (310) is not allowed, the network node (120) receives the paging request at once.

In one or more embodiments, the network node (120) is further caused to receive the paging request from the at least one other network node (130/140), when a second network node that allows idle extended discontinuous reception (310) receives the paging request.

In one or more embodiments, when the network node configuration (340) defines the at least one allowability status as the idle extended discontinuous reception (310) is allowed, the network node (120) receives the paging request only before a next paging occasion which is calculated based on an idle extended discontinuous reception (310) cycle of the user equipment (110).

In one or more embodiments, when the network node configuration (340) defines the at least one allowability status as the inactive extended discontinuous reception (320) is not allowed, the network node (120) receives the paging request at once.

In one or more embodiments, the network node (120) is further caused to receive the paging request from the at least one other network node (130/140) when a second network node (130/140) that allows inactive extended discontinuous reception (320) receives the paging request.

In one or more embodiments, when the network node configuration (340) defines the at least one allowability status as the inactive extended discontinuous reception (320) is allowed, the network node (120) receives the paging request from the at least one other network node (130/140) only before a next paging occasion which is calculated based on an inactive extended discontinuous reception (320) cycle of a user equipment (110).

In one or more embodiments, when the network node configuration (340) defines the at least one allowability status as the inactive enhanced extended discontinuous reception (330) is not allowed, the network node (120) receives the paging request at once.

In one or more embodiments, the network node (120) is further caused to receive the paging request from the at least one other network node (130/140) when a second network node that allows inactive enhanced extended discontinuous reception (330) receives the paging request.

In one or more embodiments, when the network node configuration (340) defines the at least one allowability status as the inactive enhanced extended discontinuous reception (330) is allowed, the network node (120) receives the paging request only before a next paging occasion which is calculated based on an inactive enhanced extended discontinuous reception (330) cycle of a user equipment (110).

In one or more embodiments, a core network node (130) is provided, including at least one processor and at least one memory storing instructions that, when executed by the processor, cause the core network node (130) to receive, from a network node (120), a network node configuration (340), wherein the network node configuration (340) defines at least one allowability status for at least one of idle extended discontinuous reception (310), inactive extended discontinuous reception (320), or inactive enhanced discontinuous reception (330). The core network node (130) is further caused to transmit, to the network node (120), a paging request.

In one or more embodiments, an anchor network node (140) is provided, including at least one processor and at least one memory storing instructions that, when executed by the processor, cause the anchor network node (140) to receive, from a network node (120), a network node configuration (340), wherein the network node configuration (340) defines at least one allowability status for at least one of idle extended discontinuous reception (310), inactive extended discontinuous reception (320) or inactive enhanced extended discontinuous reception (330). In one or more embodiments, the anchor network node (140) is further caused to transmit, to the network node (120), a paging request.

In one or more embodiments, a user equipment (110) is provided, including at least one processor and at least one memory storing instructions that, when executed by the processor, cause the user equipment (110) to determine (300) a user equipment configuration (300), wherein the user equipment configuration (300) includes at least one of idle extended discontinuous reception (310), inactive extended discontinuous reception (320), or inactive enhanced extended discontinuous reception (330). In one or more embodiments, the user equipment (110) is further caused to determine (340) a network node configuration (340), wherein the network node configuration (340) defines an allowability status for at least one of idle extended discontinuous reception (310), inactive extended discontinuous reception (320), or inactive enhanced extended discontinuous reception (330). In one or more embodiments, the user equipment (110) is further caused to determine (350) a discontinuous reception cycle (350) based at least on the user equipment configuration (300) and the network node configuration (340). In one or more embodiments, the user equipment (110) is further caused to receive a paging request based on the discontinuous reception cycle (350).

In one or more embodiments, when the user equipment configuration (300) includes idle extended discontinuous reception (310), and when the network node configuration (340) defines the allowability status as idle extended discontinuous reception (310) is allowed, the discontinuous reception cycle (350) is set to the idle extended discontinuous reception (310).

In one or more embodiments, when the user equipment configuration (300) includes idle extended discontinuous reception (310), and when the network node configuration (340) defines the allowability status as idle extended discontinuous reception (310) is not allowed, the discontinuous reception cycle (350) is set to the discontinuous reception (370).

In one or more embodiments, when the user equipment configuration (300) includes inactive extended discontinuous reception (320) and not inactive enhanced extended discontinuous reception (330), and when the network node configuration (340) defines the allowability status as inactive extended discontinuous reception (320) is allowed, the discontinuous reception cycle (350) is set to inactive extended discontinuous reception (320).

In one or more embodiments, when the user equipment configuration (300) includes inactive extended discontinuous reception (320) and not inactive enhanced extended discontinuous reception (330), and when the network node configuration (340) defines the allowability status as inactive extended discontinuous reception (320) is not allowed, the discontinuous reception cycle (350) is set to inactive discontinuous reception (380).

In one or more embodiments, when the user equipment configuration (300) includes inactive enhanced extended discontinuous reception (330) and not inactive extended discontinuous reception (320), and when the network node configuration (340) defines the allowability status as inactive enhanced extended discontinuous reception (330) is allowed, the discontinuous reception cycle (350) is set to inactive enhanced discontinuous reception.

In one or more embodiments, when the user equipment configuration (300) includes inactive enhanced extended discontinuous reception (330) and not inactive extended discontinuous reception (320), and when the network node configuration (340) defines the allowability status as inactive enhanced extended discontinuous reception (330) is not allowed, the discontinuous reception cycle (350) is set to inactive discontinuous reception (380).

In one or more embodiments, when the user equipment configuration (300) includes both (360) inactive extended discontinuous reception (320) and inactive enhanced extended discontinuous reception (330), and when the network node configuration (340) defines the allowability status as inactive enhanced extended discontinuous reception (330) is not allowed and inactive extended discontinuous reception (320) is not allowed, the discontinuous reception cycle (350) is set to inactive discontinuous reception (380).

In one or more embodiments, when the user equipment configuration (300) includes both (360) inactive extended discontinuous reception (320) and inactive enhanced extended discontinuous reception (330), and when the network node configuration (340) defines the allowability status as inactive enhanced extended discontinuous reception (330) is allowed and inactive extended discontinuous reception (320) is not allowed, the discontinuous reception cycle (350) is set to inactive enhanced extended discontinuous reception (330).

In one or more embodiments, when the user equipment configuration (300) includes both (360) inactive extended discontinuous reception (320) and inactive enhanced extended discontinuous reception (330), and when the network node configuration (340) defines the allowability status as inactive enhanced extended discontinuous reception (330) is not allowed and inactive extended discontinuous reception (320) is allowed, the discontinuous reception cycle (350) is set to inactive extended discontinuous reception (320).

In one or more embodiments, when the user equipment configuration (300) includes both (360) inactive extended discontinuous reception (320) and inactive enhanced extended discontinuous reception (330), and when the network node configuration (340) defines the allowability status as inactive enhanced extended discontinuous reception (330) is allowed and inactive extended discontinuous reception (320) is allowed, the discontinuous reception cycle (350) is set to inactive enhanced extended discontinuous reception (330).

In one or more embodiments, a computer-implemented method is provided, including performing, by a network node (120), transmitting a network node configuration (340) to at least one other network node (130/140), wherein the network node configuration (340) defines at least one allowability status for at least an idle extended discontinuous reception (310). The computer-implemented method further includes receiving a paging request from the at least one other network node (130/140).

In one or more embodiments, a computer-implemented method is provided that is performed by a core network node (130) and includes receiving, from a network node (120), a network node configuration (340), wherein the network node configuration (340) defines at least one allowability status for at least one of idle extended discontinuous reception (310), inactive extended discontinuous reception (320), or inactive enhanced discontinuous reception (330). In one or more embodiments, the computer-implemented method further includes transmitting, to the network node (120), a paging request.

In one or more embodiments, a computer-implemented method is provided that is performed by an anchor network node (140) and includes receiving, from a network node (120), a network node configuration (340), wherein the network node configuration (340) defines at least one allowability status for at least one of idle extended discontinuous reception (310), inactive extended discontinuous reception (320) or inactive enhanced extended discontinuous reception (330). The computer-implemented method further includes transmitting, to the network node (120), a paging request.

In one or more embodiments, a computer-implemented method is provided that is performed by a user equipment (110) and includes determining (300) a user equipment configuration (300), wherein the user equipment configuration (300) includes at least one of idle extended discontinuous reception (310), inactive extended discontinuous reception (320), or inactive enhanced extended discontinuous reception (330). In one or more embodiments, the computer-implemented method further includes determining (340) a network node configuration (340), wherein the network node configuration (340) defines an allowability status for at least one of idle extended discontinuous reception (310), inactive extended discontinuous reception (320), or inactive enhanced extended discontinuous reception (330). In one or more embodiments, the computer-implemented method further includes determining (350) a discontinuous reception cycle (350) based at least on the user equipment configuration (300) and the network node configuration (340). In one or more embodiments, the computer-implemented method further includes receiving a paging request based on the discontinuous reception cycle (350).

In one or more embodiments, a non-transitory computer readable storage medium is provided including computer instructions that, when executed by a network node, cause the network node to transmit a network node configuration (340) to at least one other network node (130/140), wherein the network node configuration (340) defines at least one allowability status for at least an idle extended discontinuous reception (310). The network node (120) is further caused to receive a paging request from the at least one other network node (130/140).

In one or more embodiments, a non-transitory computer readable storage medium is provided including computer instructions that, when executed by a core network node, cause the core network node to receive, from a network node (120), a network node configuration (340), wherein the network node configuration (340) defines at least one allowability status for at least one of idle extended discontinuous reception (310), inactive extended discontinuous reception (320), or inactive enhanced discontinuous reception (330). The core network node (130) is further caused to transmit, to the network node (120), a paging request.

In one or more embodiments, a non-transitory computer readable storage medium is provided including computer instructions that, when executed by an anchor network node, cause the anchor network node to receive, from a network node (120), a network node configuration (340), wherein the network node configuration (340) defines at least one allowability status for at least one of idle extended discontinuous reception (310), inactive extended discontinuous reception (320) or inactive enhanced extended discontinuous reception (330). In one or more embodiments, the anchor network node (140) is further caused to transmit, to the network node (120), a paging request.

In one or more embodiments, a non-transitory computer readable storage medium is provided including computer instructions that, when executed by a user equipment, cause the user equipment to determine (300) a user equipment configuration (300), wherein the user equipment configuration (300) includes at least one of idle extended discontinuous reception (310), inactive extended discontinuous reception (320), or inactive enhanced extended discontinuous reception (330). In one or more embodiments, the user equipment (110) is further caused to determine (340) a network node configuration (340), wherein the network node configuration (340) defines an allowability status for at least one of idle extended discontinuous reception (310), inactive extended discontinuous reception (320), or inactive enhanced extended discontinuous reception (330). In one or more embodiments, the user equipment (110) is further caused to determine (350) a discontinuous reception cycle (350) based at least on the user equipment configuration (300) and the network node configuration (340). In one or more embodiments, the user equipment (110) is further caused to receive a paging request based on the discontinuous reception cycle (350).

In one or more embodiments, a network node is provided that includes means for transmitting a network node configuration (340) to at least one other network node (130/140), wherein the network node configuration (340) defines at least one allowability status for at least an idle extended discontinuous reception (310). The network node (120) further includes means for receiving a paging request from the at least one other network node (130/140).

In one or more embodiments, a core network node is provided that includes means for receiving, from a network node (120), a network node configuration (340), wherein the network node configuration (340) defines at least one allowability status for at least one of idle extended discontinuous reception (310), inactive extended discontinuous reception (320), or inactive enhanced discontinuous reception (330). The core network node further includes means for transmitting, to the network node (120), a paging request.

In one or more embodiments, an anchor network node is provided that includes means for receiving, from a network node (120), a network node configuration (340), wherein the network node configuration (340) defines at least one allowability status for at least one of idle extended discontinuous reception (310), inactive extended discontinuous reception (320) or inactive enhanced extended discontinuous reception (330). In one or more embodiments, the anchor network node (140) further includes means for transmitting, to the network node (120), a paging request.

In one or more embodiments, a user equipment is provided that includes means for determining (300) a user equipment configuration (300), wherein the user equipment configuration (300) includes at least one of idle extended discontinuous reception (310), inactive extended discontinuous reception (320), or inactive enhanced extended discontinuous reception (330). In one or more embodiments, the user equipment (110) further includes means for determining (340) a network node configuration (340), wherein the network node configuration (340) defines an allowability status for at least one of idle extended discontinuous reception (310), inactive extended discontinuous reception (320), or inactive enhanced extended discontinuous reception (330). In one or more embodiments, the user equipment (110) further includes means for determining (350) a discontinuous reception cycle (350) based at least on the user equipment configuration (300) and the network node configuration (340). In one or more embodiments, the user equipment (110) further includes means for receiving a paging request based on the discontinuous reception cycle (350).

Many modifications and other embodiments set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A network node, comprising:

at least one processor; and at least one memory storing instructions that, when executed by the processor, cause the network node to perform:

transmit a network node configuration to at least one other network node, wherein the network node configuration defines at least one allowability status for at least an idle extended discontinuous reception, wherein the network node configuration defines one or more allowability statuses associated with a plurality of cells; and receive a paging request from the at least one other network node, wherein when the network node configuration defines the at least one allowability status as the idle extended discontinuous reception is allowed, the network node receives the paging request only before a next paging occasion which is calculated based on an idle extended discontinuous reception cycle of a user equipment, wherein the network node configuration further defines all of:

an allowability status for inactive extended discontinuous reception or an inactive enhanced extended discontinuous reception;

the at least one allowability status as the idle extended discontinuous reception is not allowed, the network node receives the paging request at once;

the at least one allowability status as the inactive extended discontinuous reception is not allowed, the network node receives the paging request at once; and the at least one allowability status as the inactive extended discontinuous reception is allowed, the network node receives the paging request from the at least one other network node only before a next paging occasion which is calculated based on an inactive extended discontinuous reception cycle of a user equipment.

2. The network node of claim 1, wherein the network node comprises at least: a base station, a radio access network (RAN) node, or a gNB, and the at least one other network node that comprises a core network that further comprises at least an access mobility and management function (AMF).

3. The network node of claim 1, wherein the receiving of the paging request from the at least one other network node is based at least on the network node configuration.

4. The network node of claim 1, wherein the network node is further caused to: receive the paging request from the at least one other network node, when a second network node that allows idle extended discontinuous reception receives the paging request.

5. The network node of claim 1, wherein the network node is further caused to: receive the paging request from the at least one other network node when a second network node that allows inactive extended discontinuous reception receives the paging request.

6. The network node of claim 1, wherein the network node is further caused to: receive the paging request from the at least one other network node when a second network node that allows inactive enhanced extended discontinuous reception receives the paging request.

7. A user equipment, comprising:

at least one processor; and at least one memory storing instructions that, when executed by the processor, cause the user equipment to perform:

determine a user equipment configuration, wherein the user equipment configuration comprises at least one of idle extended discontinuous reception, inactive extended discontinuous reception, or inactive enhanced extended discontinuous reception;

determine a network node configuration by receiving a broadcast indicating that inactive enhanced extended discontinuous reception is allowed, wherein the network node configuration defines an allowability status for at least one of idle extended discontinuous reception, inactive extended discontinuous reception, or inactive enhanced extended discontinuous reception, wherein the network node configuration defines one or more allowability statuses associated with a plurality of cells;

determine a discontinuous reception cycle based at least on the user equipment configuration and the network node configuration; and receive a paging request based on the discontinuous reception cycle, wherein paging failure is only declared after the user equipment has been paged based on a longest extended discontinuous reception cycle the user equipment is configured with, wherein the network node configuration defines all of:

an allowability status for inactive extended discontinuous reception or an inactive enhanced extended discontinuous reception;

the at least one allowability status as the idle extended discontinuous reception is not allowed, the network node receives the paging request at once;

the at least one allowability status as the idle extended discontinuous reception is allowed, the network node receives the paging request only before a next paging occasion which is calculated based on an idle extended discontinuous reception cycle of a user equipment;

the at least one allowability status as the inactive extended discontinuous reception is not allowed, the network node receives the paging request at once; and the at least one allowability status as the inactive extended discontinuous reception is allowed, the network node receives the paging request from the at least one other network node only before a next paging occasion which is calculated based on an inactive extended discontinuous reception cycle of a user equipment.

8. The user equipment of claim 7, wherein when the user equipment configuration comprises idle extended discontinuous reception, and when the network node configuration defines the allowability status as idle extended discontinuous reception is allowed, the discontinuous reception cycle is set to the idle extended discontinuous reception.

9. The user equipment of claim 7, wherein when the user equipment configuration comprises idle extended discontinuous reception, and when the network node configuration defines the allowability status as idle extended discontinuous reception is not allowed, the discontinuous reception cycle is set to the discontinuous reception.

10. The user equipment of claim 7, wherein when the user equipment configuration comprises inactive extended discontinuous reception and not inactive enhanced extended discontinuous reception, and when the network node configuration defines the allowability status as inactive extended discontinuous reception is allowed, the discontinuous reception cycle is set to inactive extended discontinuous reception.

11. The user equipment of claim 7, wherein when the user equipment configuration comprises inactive extended discontinuous reception and not inactive enhanced extended discontinuous reception, and when the network node configuration defines the allowability status as inactive extended discontinuous reception is not allowed, the discontinuous reception cycle is set to inactive discontinuous reception.

12. The user equipment of claim 7, wherein when the user equipment configuration comprises inactive enhanced extended discontinuous reception and not inactive extended discontinuous reception, and when the network node configuration defines the allowability status as inactive enhanced extended discontinuous reception is allowed, the discontinuous reception cycle is set to inactive enhanced discontinuous reception.

13. The user equipment of claim 7, wherein when the user equipment configuration comprises inactive enhanced extended discontinuous reception and not inactive extended discontinuous reception, and when the network node configuration defines the allowability status as inactive enhanced extended discontinuous reception is not allowed, the discontinuous reception cycle is set to inactive discontinuous reception.

14. The user equipment of claim 7, wherein when the user equipment configuration comprises both inactive extended discontinuous reception and inactive enhanced extended discontinuous reception, and when the network node configuration defines the allowability status as inactive enhanced extended discontinuous reception is not allowed and inactive extended discontinuous reception is not allowed, the discontinuous reception cycle is set to inactive discontinuous reception.

15. The user equipment of claim 7, wherein when the user equipment configuration comprises both inactive extended discontinuous reception and inactive enhanced extended discontinuous reception, and when the network node configuration defines the allowability status as inactive enhanced extended discontinuous reception is allowed and inactive extended discontinuous reception is not allowed, the discontinuous reception cycle is set to inactive enhanced extended discontinuous reception.

16. The user equipment of claim 7, wherein when the user equipment configuration comprises both inactive extended discontinuous reception and inactive enhanced extended discontinuous reception, and when the network node configuration defines the allowability status as inactive enhanced extended discontinuous reception is not allowed and inactive extended discontinuous reception is allowed, the discontinuous reception cycle is set to inactive extended discontinuous reception.

17. The user equipment of claim 7, wherein when the user equipment configuration comprises both inactive extended discontinuous reception and inactive enhanced extended discontinuous reception, and when the network node configuration defines the allowability status as inactive enhanced extended discontinuous reception is allowed and inactive extended discontinuous reception is allowed, the discontinuous reception cycle is set to inactive enhanced extended discontinuous reception.

18. The user equipment of claim 7, wherein:

the determining of the network node configuration comprises receiving all of: a broadcast indicating that idle extended discontinuous reception is allowed, a broadcast indicating that inactive extended discontinuous reception is allowed, and a broadcast indicating that inactive enhanced extended discontinuous reception is allowed;

the network node configuration is specific to a cell;

the user equipment uses a shortest of available discontinuous reception cycles; and the discontinuous reception cycle comprises a user equipment-specific cycle configured via one or more of radio resource control (RRC) signaling or non access stratum (NAS) signaling.

* * * * *